United States Patent
Arnason

[19]

[11] Patent Number: 6,066,037
[45] Date of Patent: May 23, 2000

[54] HANDLING DEVICE

[75] Inventor: Ingolfur Arnason, Akranes, Iceland

[73] Assignee: Marel hf, Reykjavik, Iceland

[21] Appl. No.: 09/194,082

[22] PCT Filed: May 22, 1997

[86] PCT No.: PCT/IS97/00003

§ 371 Date: Nov. 20, 1998

§ 102(e) Date: Nov. 20, 1998

[87] PCT Pub. No.: WO97/45349

PCT Pub. Date: Dec. 4, 1997

[30] Foreign Application Priority Data

May 24, 1996 [DK] Denmark ................................. 0604/96

[51] Int. Cl.[7] .................................................. A22B 7/00
[52] U.S. Cl. .......................................... 452/183; 452/182
[58] Field of Search .................................... 452/183, 182, 452/177, 170

[56] References Cited

U.S. PATENT DOCUMENTS 2,771,632  11/1956  Walker .
3,919,741  11/1975  Backhaus et al. ....................... 452/170
4,084,293   4/1978  Hogan et al. ............................ 452/170
5,370,873  12/1994  Warren et al. .......................... 452/170
5,580,303  12/1996  Winslow et al. ........................ 452/170
5,591,076   1/1997  Evers et al. ............................ 452/170

FOREIGN PATENT DOCUMENTS

1005540 A3  9/1993  Belgium .
   1010092  6/1952  France .
    504 804  4/1997  Sweden .

*Primary Examiner*—Willis Little
*Attorney, Agent, or Firm*—Pillsbury Madison & Sutro LLP

[57] ABSTRACT

A conveyor belt feeder for automatically transferring pieces of meat, such as salmon fillets, onto a transverse conveyor belt comprises a platform (2), which is carried by a support (1) and is displaceably arranged in a direction (3) to and fro said support. The platform (2) carries a transfer belt (35) for receiving the piece of meat in question. This transfer belt (35) extends beyond a front rim on the platform (2) and is operationally connected thereto in such a manner that its upward surface is moved forwards and around the front rim of the platform (2) substantially synchronously with the advancing movement of the platform (2). Driving means (15) are also provided for effecting the displacement of the platform (2).

8 Claims, 3 Drawing Sheets

HANDLING DEVICE

TECHNICAL FIELD

The invention relates to a conveyor belt feeder for automatically transferring pieces of meat, such as salmon fillets onto a conveyor belt.

BACKGROUND ART

It is known in connection with processing of fish that each operator removes a fish fillet from a conveyor belt and carries out a few manual operations, such as removal of bones and blood spots, so as subsequently to place the fillets in a bin. The fillets are emptied on a second conveyor belt advancing the fillets to a scale, where the weight of said fillets is determined. Subsequently, the fillets are suitably portioned and the yield and throughput of each operator are calculated.

The existing plants do not render it possible to ensure that each fillet is placed in a nicely straightened state on the continuously running conveyor belt when said fillet is emptied out of the bin. It is important especially in connection with fish fillets, such as salmon fillets, that said fillets are handled carefully in such a manner that they are not positioned on the conveyor belt in a folded state, which might imply both that the quality of the fillet is deteriorated and that the measurement of the weight is encumbered with difficulties. These difficulties do not apply in the same extent to other fish fillets, such as white fish, codfish, coalfish etc.

BRIEF DESCRIPTION OF THE INVENTION

The object of the invention is therefore to provide a conveyor belt feeder allowing a transfer of delicate pieces of meat, such as salmon fillets, onto a conveyor belt in such a manner that the pieces of meat in question are placed thereon in a non-folded state.

The conveyor belt feeder according to the invention is characterised in that it comprises a platform which is carried by a support and which is displaceably arranged in a direction to and fro said support, whereby the platform carries a transfer belt receiving the piece of meat in question, that the transfer belt extends beyond a front rim on said platform and is operationally connected to said platform in such a manner that its upward surface is moved forwards and around said front rim of the platform substantially synchronously with the advancing movement of the platform, and that driving means are provided for effecting the displacement of the platform.

As a result a conveyor belt feeder is obtained which comprises a belt, said belt in a stopped state allowing a placing of the piece of meat in question in a nicely non-folded state. When the advancing movement of the platform inwards over a conveyor belt is activated, the above belt allows a fast and lenient transfer of the piece of meat in the same state onto the continuously advanced, optionally transverse conveyor belt. The advancing movement of the platform carries the piece of meat beyond the front rim of the platform whereby said piece of meat falls freely downwards onto the conveyor belt in a state substantially corresponding to the state in which it was placed on the transfer belt while said transfer belt was still in use. After the piece of meat has left the transfer belt and consequently the platform, said platform is quickly returned to its starting position in which it is ready for receiving the next piece of meat.

According to the invention it is particularly preferred that the platform comprise a plate with a curved, front and rear end when seen in the moving direction of the platform, and that the transfer belt extends across the upper surface of the platform and around the curved ends, said transfer belt comprising a front and rear end secured to the support on the bottom side of the platform. In this manner a relative movement of the platform and the transfer belt is allowed without the use of lubricants, which might present a risk when the hygienic requirements are to be met.

According to the invention the support may carry two parallel beams extending parallel to one another and parallel to the front and rear end of the platform adjacent the bottom side of said platform, and which are adapted to assemble the transfer belt, said beams comprising an intermediate slot for receiving abutting portions of the transfer belt at their respective ends thereof. As a result it is ensured in a simple manner that the platform can perform its forward and backward movement despite the fixed connection of the transfer belt with the support.

The assembling beams may according to the invention each be of a circular cross section in such a manner that the load on the belt is distributed across a large area of the periphery of said assembling beams.

The two ends of the transfer belt may according to the invention particularly advantageously be interconnected to form an endless belt, and the transfer belt may be secured to the support by means of a transverse bar extending through a loop in said transfer belt.

Moreover according to the invention the transfer belt may comprise transverse projecting ribs for defining a receiving chamber on the top side of the platform in the retracted starting position thereof. In this manner it is ensured both that the operator places the piece of meat in question within the desired area of the transfer belt, and that said piece of meat is reliably carried beyond the front rim of the platform when said platform is moved forwards.

According to the invention it is particularly preferred that the platform is moved forwards and backwards on the support by means of a pneumatically driven cylinder.

Finally according to the invention the platform may be carried by side members covering their respective sides of said platform and extending downwards on their respective sides of the support, each side member comprising guide means displaceably arranged on a pneumatic cylinder arranged on each side of the support, where the piston rod of said pneumatic cylinder is connected to the side member in question. The resulting conveyor belt feeder is particularly simple.

BRIEF DESCRIPTION OF THE DRAWINGS

The invention is explained in greater detail below with reference to the accompanying drawing, in which.

BEST MODE FOR CARRYING OUT THE INVENTION

Figure 1:
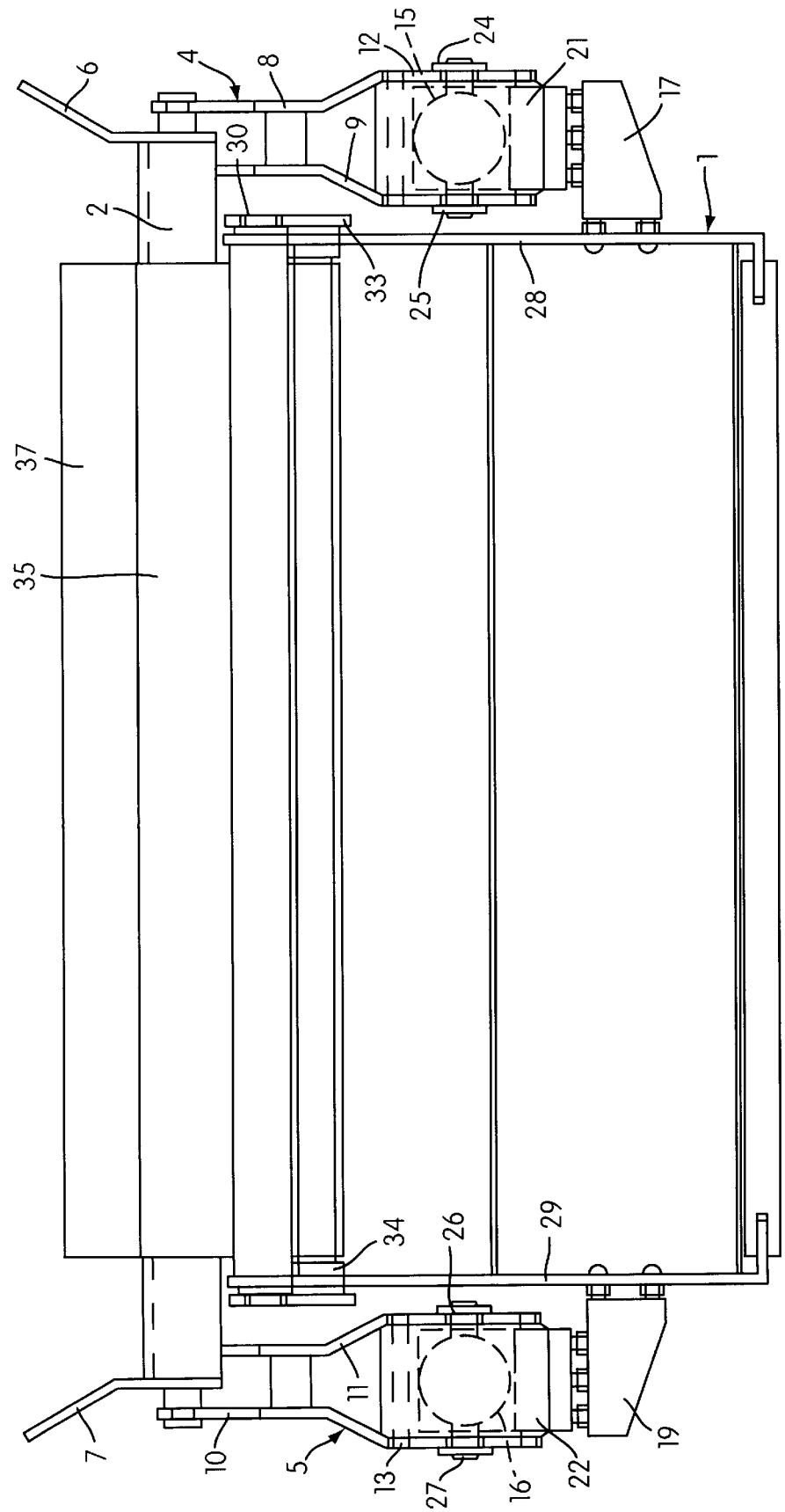
FIG. 1 is a front view of a conveyor belt feeder according to the invention.

The conveyor belt feeder illustrated in the drawing comprises a stationary support designated the general reference numeral 1, and a platform 2 displaceably arranged on said support. The platform comprises a plate of a suitable material, such as polyacethylene. This plate is bent in a curved manner at both the front and the rear end when seen relative to the advancing direction of the platform, said advancing direction being indicated by an arrow 3 in FIGS. 2 and 3.

The platform 2 is at each end carried by a side member designated the general reference numeral 4 and 5, respectively. Each side member comprises an upper, bent plate 6 and 7, respectively, projecting to a level above the platform 2 and covering the sides of said platform. On the bottom side, the side members 4 and 5 comprise their respective two bent plates 8, 9 and 10, 11, respectively, which are arranged in parallel and at the top detachably secured to the platform together with the upper, bent plate 6, 7 and at the bottom carry a slide shoe 12 and 13, respectively, cf. especially FIGS. 2 and 3. These slide shoes are slidably secured to their respective pneumatic cylinders 15, 16, which in turn are fixedly connected to the support 1 by means of brackets 17, 18 and 19, respectively.

Thus the platform with the side members 4, 5 is carried in a slidably displaceable manner by the pneumatic cylinders 15, 16 fixed to the support 1. The piston rods 20 of the cylinders 15, 16 are at their front free ends secured to their respective transverse members 21 and 22, which in turn are secured to the front end of the two lower, bent plates 8, 9 and 10, 11, respectively, when seen in the advancing direction 3 of the platform, said plates 8, 9 and 10, 11 forming part of the side members 4 and 5 of the platform 2. In this manner the pneumatic cylinders 15, 16 are able to move the platform forwards and backwards in the direction shown by means of the arrow 3.

Figure 2:
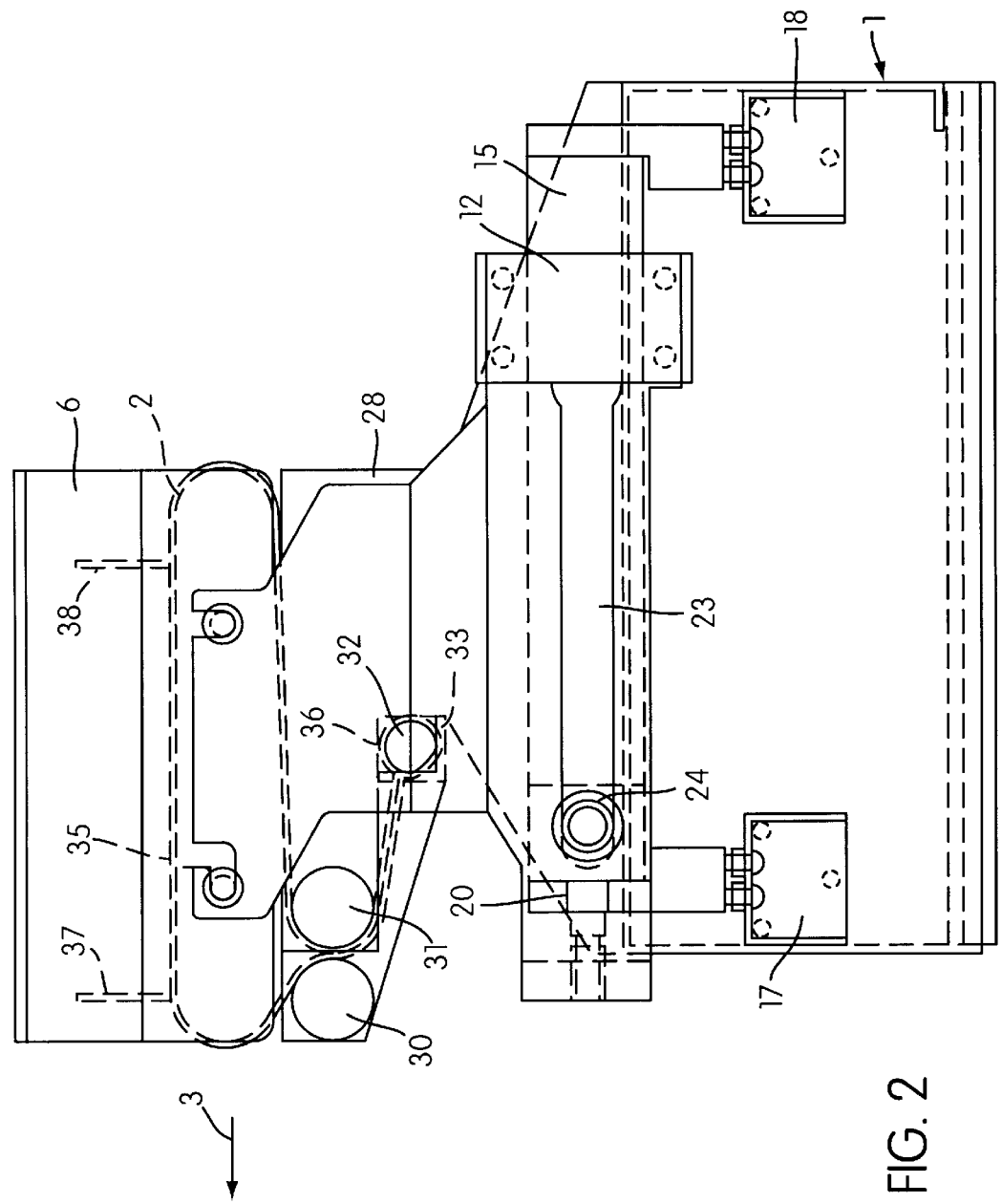
FIG. 2 is a side view on a larger scale of the conveyor belt feeder of FIG. 1 and where the platform is in a retracted starting position.
Figure 3:
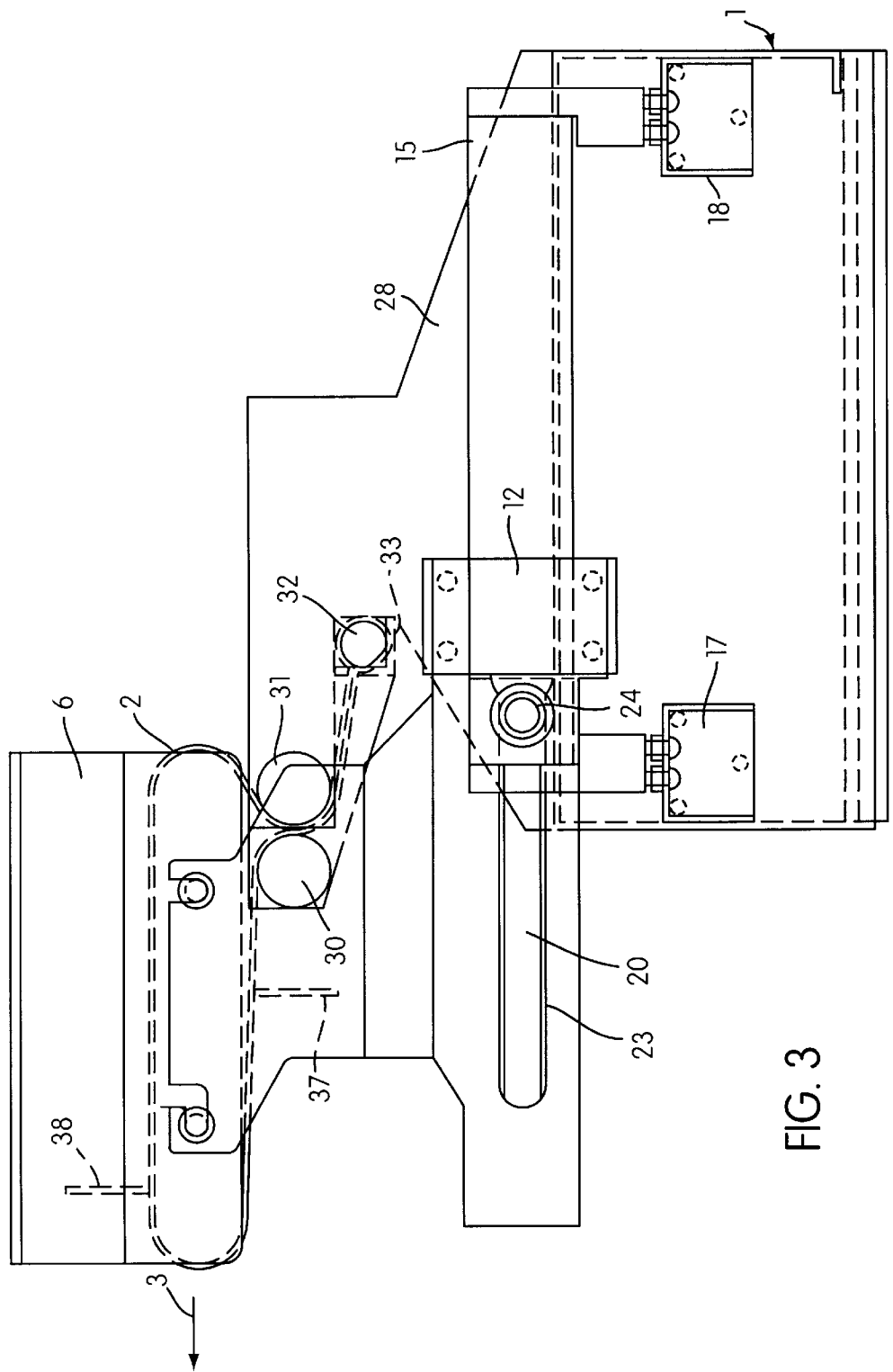
FIG. 3 is a side view on a larger scale of the conveyor belt feeder of FIG. 1 and where the platform is in an advanced position.

An additional control of the above movement is obtained by means of rectilinear guideways 23, cf. FIGS. 2 and 3, shaped in the lower bent plates 8–11. The guideways 23 are adapted to co-operate with guide means 24, 25, 26 and 27, respectively, secured to the front end of the cylinders 15, 16. As illustrated in particular in FIG. 1, the support 1 comprises two plate-shaped side members 28, 29, which at the top carry two transverse and parallel beams 30, 31. These beams 30, 31 are of a circular cross section and they are arranged at a level immediately below the platform 2 adjacent the front end of said platform 2 when it is in a starting position. A round transverse bar 32 is loosely secured below these beams 30, 31, said bar 32 at the ends resting in an L-shaped holder 33 and 34, respectively. An endless belt 35 of a suitable plastic material is arranged around the platform 2. This belt extends around the platform 2 and downwards through a slot between the two beams 30, 31, which thereby serve to maintain the belt in a course close to the platform both on the top side and on the bottom side of said platform. From the slot between the beams 30, 31, the belt 35 extends to the bar 32, said bar 32 extending through a loop 36 in the belt 35 so as thereby to maintain the belt 35 in a state closely abutting the top side of the platform and while said belt is secured to the support 1 in such a manner that it cannot be displaced in a direction around the bar 32.

In the state shown in FIG. 2 the platform 2 is in a retracted starting position when seen relative to the advancing direction 3, and in this state the belt 35 comprises two ribs 37, 38 positioned on the top side of the platform. These ribs 37, 38 extend across the belt 35. The ribs 37, 38 are besides also arranged such that the rib 37 is positioned adjacent the front end of the platform 2 in the starting position of the platform 2 shown in FIG. 2, while the rib 38 is positioned close to the front end of the platform in the advanced position of the platform 2 shown in FIG. 3.

When the platform 2 is displaced forwards from the position shown in FIG. 2 to the position shown in FIG. 3 and backwards again to the position shown in FIG. 2, the belt 35 moves around said platform 2 while the portion of the belt 35 positioned below the platform 2 is simultaneously fixed by the support 1 by means of the beams 30, 31 and the bar 32. As a result, the belt moves relative to the platform 2 a short distance forwards and around the front end of said platform 2 and back again to its starting position.

When the described conveyor belt feeder is in use, the operator places a fish fillet or another piece of meat between the ribs 37 and 38 on the belt 35 and activates the cylinders 15 and 16 in a manner not described in greater detail so as to drive the platform 2 forwards in the direction indicated by means of the arrow 3. As a result the piece of meat in question is carried beyond the front end of the platform 2, where it can fall freely downwards onto a transverse conveyor belt not shown, but which in use of the conveyor belt feeder is paced immediately below the front end of the platform 2 in the advanced position thereof. Immediately after the advancing movement, the platform 2 is returned to its starting position, and it is again ready to receive the next piece of meat.

The invention has been described with reference to a preferred embodiment. Many modifications can be carried out without thereby deviating from the scope of the invention. It is for instance possible to use a belt with two ends instead of an endless belt 2, where each end is secured at the bottom side of the platform 2 fixedly connected to the support 1. The sliding connection between the support 1 and the platform 2 can, of course, also be established in another manner beyond the one employing the slide shoes 12 and 13 and the cylinders 15 and 16 so that the activation can be carried out by means of only one cylinder.

I claim:

1. A conveyor belt feeder for automatically transferring pieces of meat, such as salmon fillets, onto a conveyor belt, said conveyor belt feeder comprising a platform which is carried by a support and displaceable to and from said support, said platform carrying a transfer belt receiving the piece of meat in question, said transfer belt extending beyond a front rim on the platform and operationally connected to the platform in such a manner that its upward surface is moved forwards and around the front rim of the platform substantially synchronously with the advancing movement of the platform, and driving means provided for effecting the displacement of the platform.

2. A conveyor belt feeder as claimed in claim 1, wherein said platform comprises a plate with a curved front and rear end when seen in the moving direction of the platform, and that the transfer belt extends across the upper surface of the platform and around the curved ends, said transfer belt per se comprising a front and rear end secured to the support on the bottom side of the platform.

3. A conveyor belt feeder as claimed in claim 2, wherein said support carries two parallel beams extending parallel to one another and parallel to the front and rear end of the platform adjacent the bottom side of said platform, and which are adapted to assemble the transfer belt, said beams comprising an intermediate slot for receiving abutting portions of the transfer belt at their respective ends thereof.

4. A conveyor belt feeder as claimed in claim 3, wherein assembling beams have their respective circular cross sections.

5. A conveyor belt feeder as claimed in claim 3, wherein said two ends of the transfer belt are interconnected to form an endless belt, and that the transfer belt is secured to the support by means of a transverse bar extending through a loop of the transfer belt.

6. A conveyor belt feeder as claimed in claim 1, wherein said transfer belt comprises transverse projecting ribs for defining a receiving chamber on the top side of the platform in the retracted position thereof.

7. A conveyor belt feeder as claimed in claim 6, wherein said platform is driven forwards and backwards on the support by means of a pneumatically driven cylinder.

8. A conveyor belt feeder as claimed in claim 1, wherein said platform is carried by side members covering their respective sides of said platform (2) and extending downwards on their respective sides of the support (1), and that each side member comprises guide means displaceably arranged on a pneumatic cylinder arranged on each side of the support, where the piston rod of said pneumatic cylinder is connected to the side member (4, 5) in question.

* * * * *